Aug. 6, 1935. F. E. S. SAWYER 2,010,325
RAKE ATTACHMENT
Filed March 18, 1935
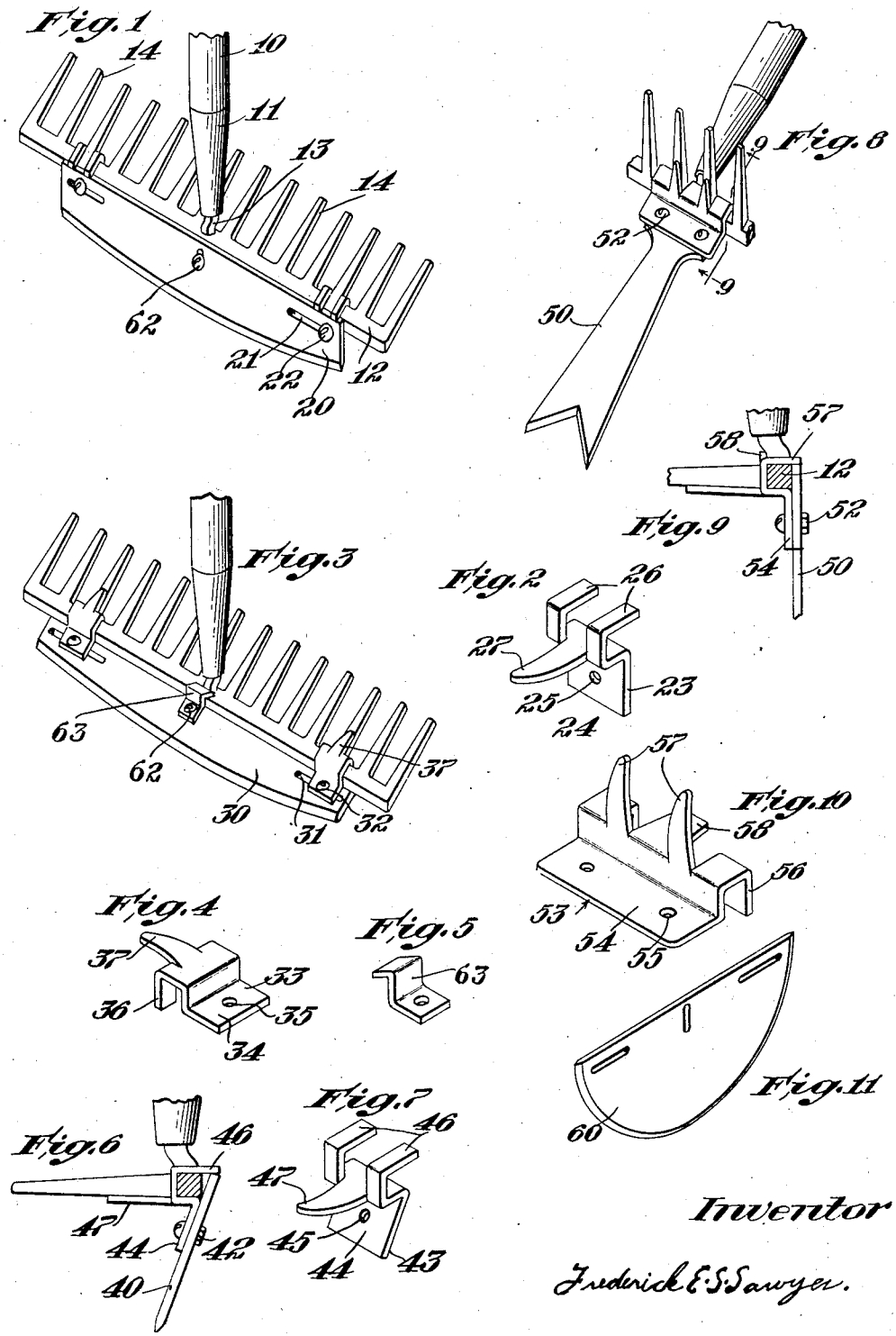
Inventor
Frederick E. S. Sawyer.

Patented Aug. 6, 1935

2,010,325

UNITED STATES PATENT OFFICE 2,010,325

RAKE ATTACHMENT

Frederick E. S. Sawyer, Belmont, Mass.

Application March 18, 1935, Serial No. 11,553

4 Claims. (Cl. 55—10)

This invention relates to rake attachments and more particularly to the provision of blades and clamping brackets which may be attached to the head of an ordinary garden rake to convert the rake into any one of a variety of implements for use in edge cutting, hoeing, weeding, etc.

It is an object of my invention to employ blades of simple design which can be readily manufactured in standard sizes and to provide clamping brackets of special design which fit over the rake head and form supports to which the blades may be readily attached and detached.

The clamping brackets are designed to engage the teeth of the rake and the blade so as to form a rigid connection which will not become displaced under the stresses occasioned by use while preserving convenience of assembly and adaptability to various sizes of rakes.

Further objects and advantages will be readily apparent from the following detailed description taken in connection with the attached drawing, in which:—

Fig. 1 is a perspective view of the head of a rake having an edge cutting blade attached thereto;

Fig. 2 is a perspective view of one of the bracket clamps shown in Fig. 1;

Fig. 3 is a perspective view of a rake head having a hoe blade attached thereto;

Fig. 4 is a perspective view of one of the end bracket clamps shown in Fig. 3;

Fig. 5 is a perspective view of the center clamp shown in Fig. 3;

Fig. 6 is a side view of a rake head having a scuffle hoe attachment;

Fig. 7 is a perspective view of the bracket clamp shown in Fig. 6;

Fig. 8 is a perspective view of a rake head having a weeding attachment;

Fig. 9 is a sectional view on the plane indicated 9—9 in Fig. 8;

Fig. 10 is a perspective view of the bracket clamp shown in Figs. 8 and 9; and,

Fig. 11 is a perspective view of a modified form of the edge-cutting blade shown in Fig. 1.

A conventional garden rake may be used having handle 10, shank 11, head 12, tong 13 and teeth 14.

The edge-cutting blade 20 is attached to extend at a right angle to the plane of the rake teeth 13. The ends of the blade 20 have slots 21 adapted to receive fastening bolts 22, which secure the blade to the bracket clamps 23. Each bracket clamp 23 is formed to hook over the rake head 12 and to provide a depending flange 24 having a hole 25 to receive the bolt 22. The bracket 23 has hook-shaped or U-shaped fingers 26 which fit over the rake head as shown in Fig. 1. The fingers 26 straddle one of the prongs of the rake to hold the bracket against displacement. The bracket is further provided with an intermediate tongue 27 which seats against a face of the rake prong and thereby prevents rotation of the bracket with respect to the rake head. It will be noted that the fingers 26 extend beyond the plane of the flange 24 so that the blade 20 will abut against the ends of the fingers 26 and relieve the stresses which would otherwise fall on the fastening bolts. The bracket clamps need not be positioned at a fixed distance apart as the provision of the slot 21 in the blade 20 accommodates for such variation as may occur with different sizes of rakes.

The hoe blade 30 having slots 31 is secured by bolts 32 to the bracket clamps 33 which have flanges 34 provided with bolt receiving openings 35. The fingers 36 straddle a prong of the rake head as in Fig. 3, and the intermediate prongs 37 bear against the inner faces of the prongs. In this form, however, the blade is parallel to the rake head instead of at a right angle as in Fig. 1.

The scuffle hoe blade 40 in Fig. 6 is attached in a similar manner to the bracket clamp 43 which has hook-shaped fingers 46 and an intermediate tongue 47. The bracket clamp is formed to position the blade at an acute angle with respect to the rake teeth as clearly appears in Fig. 6.

The weeder blade 50 of Fig. 8 is narrow and only requires a single bracket clamp 53 as shown in Fig. 10. The blade is attached by bolts 52 which are received in openings 55 in the flange 54 of the bracket 53. The bracket has three spaced fingers, the end fingers 56 being hook-shaped and the control finger 58 being straight. The fingers 56 and 57 are separated by two intermediate tongues 57. The attachment is similar to that of the edge cutting blade 20 as the weeder blade 50 is at a right angle to the plane of the rake head. The straight finger 58 bears against the tong 13 of the rake head.

Fig. 11 shows a modified form of edge cutting blade 60 which may be used in place of the blade 20.

To further strengthen the attachments of the replaceable blades to the rake additional clamps 63 such as shown in Fig. 5 may be employed. These clamps are formed to engage the rake head at the center of the rake and to be fastened to the blades by bolts 62.

It will be noted that in each case the bracket clamps having the hook-shaped fingers are not fixedly secured to the rake head except by the position in which the replaceable blade is secured to the clamp to overlap the rake head and thereby hold the clamp against displacement. I have disclosed several specific embodiments of my invention as illustrative of the wide range of ways in which my invention may be practiced. It is to be understood that further modifications may be resorted to in the practice of my invention without departing from the spirit of my invention.

I claim:

1. An attachment for securing a replaceable blade firmly in place upon the head of a garden rake which comprises a bracket clamp having spaced hook-shaped fingers adapted to fit over the head of the rake and on opposite sides of a rake tooth, said clamp having an outwardly directed flange and means for fastening a replaceable blade to said flange in such position that the blade overlaps the rake head and prevents separation of the bracket clamp therefrom.

2. An attachment for a rake comprising a bracket clamp having hook-shaped fingers adapted to fit over the head of the rake and straddle a tooth of the rake, said clamp having a tongue which bears against a face of the straddled tooth and prevents rotation of the clamp, a replaceable blade and means for detachably securing said blade to said clamp.

3. A convertible attachment for a garden rake comprising a bracket clamp having spaced hook shaped fingers which fit over a rake head and engage a prong of the rake therebetween, said bracket clamp having a flange, a blade which seats flat against the flange and is secured thereto, said blade extending beyond said flange to overlap the rake head and abut against the fingers of the bracket clamp whereby the blade and bracket clamps are firmly fixed to the rake head.

4. An attachment for securing a replaceable blade to the head of a rake including a bracket clamp having spaced hook-shaped fingers adapted to fit over the head of the rake and to straddle a tooth thereof, said clamp having a tongue intermediate said fingers adapted to bear against a face of the straddled tooth, said clamp having an outwardly directed flange and means for detachably securing a blade to said flange in a position such that the blade overlaps the rake head and abuts against the fingers of the clamp.

FREDERICK E. S. SAWYER.